(12) United States Patent
Achari et al.

(10) Patent No.: US 11,418,515 B2
(45) Date of Patent: Aug. 16, 2022

(54) MULTI-VENDOR SUPPORT FOR NETWORK ACCESS CONTROL POLICIES

(71) Applicant: HEWLETT PACKARD ENTERPRISE DEVELOPMENT LP, Houston, TX (US)

(72) Inventors: Rajesh Kumar Ganapathy Achari, Mumbai (IN); Anoop Kumaran Nair, Mumbai (IN); Pattabhi Attaluri, Santa Clara, CA (US); Venkatesh Ramachandran, Bangalore (IN); Bhagya Prasad Nittur, Santa Clara, CA (US); Antoni Milton, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 110 days.

(21) Appl. No.: 16/429,375

(22) Filed: Jun. 3, 2019

(65) Prior Publication Data

US 2020/0382516 A1   Dec. 3, 2020

(51) Int. Cl.
*H04L 9/40* (2022.01)
*H04L 41/0806* (2022.01)

(52) U.S. Cl.
CPC ........ *H04L 63/104* (2013.01); *H04L 41/0806* (2013.01); *H04L 63/102* (2013.01); *H04L 63/20* (2013.01)

(58) Field of Classification Search
CPC .. G07F 17/32; G07F 17/3244; G07F 17/3262; G07F 17/3227; G07F 17/3216; G07F 17/3234; G07F 19/209; H04L 41/0813; H04L 41/0853; H04L 41/0893; H04L 63/20; H04L 63/104; H04L 63/101; H04L 63/102; H04L 63/0263; H04L 67/303; H04L 41/0806; H04L 41/0803; G06F 2221/2113; G06F 2221/2141

See application file for complete search history.

(56) References Cited

U.S. PATENT DOCUMENTS 9,009,778 B2   4/2015   Pearce et al.
10,057,775 B2   8/2018   Raleigh et al.
(Continued)

OTHER PUBLICATIONS

ClearPass Access Management System, (Research Paper), Dec. 2016, 42 Pgs.
(Continued)

*Primary Examiner* — Backhean Tiv
*Assistant Examiner* — Linh T. Nguyen
(74) *Attorney, Agent, or Firm* — Nolte Lackenbach Siegel (57) ABSTRACT

Methods and systems for specifying and enforcing network policies are provided. One method for configuring a network that includes a plurality of heterogeneous network access devices includes creating a network enforcement profile based on at least one enforcement policy, and determining a network access device group of the plurality of heterogeneous network access devices that are capable of managing the enforcement profile. The method further includes providing vendor-specific configuration parameters for at least one network access device of the network access device group so as to cause the network to manage the network enforcement profile, and applying the vendor-specific configuration parameters to the at least one network access device.

20 Claims, 7 Drawing Sheets

(56) References Cited

U.S. PATENT DOCUMENTS

| | | | |
|---|---|---|---|
| 10,366,240 B1* | 7/2019 | Maman | G06F 21/604 |
| 10,547,503 B2* | 1/2020 | Lear | H04L 67/12 |
| 10,701,078 B2* | 6/2020 | Chambers | H04L 41/0893 |
| 2007/0239987 A1* | 10/2007 | Hoole | G06F 9/45558 |
| | | | 713/169 |
| 2009/0216867 A1* | 8/2009 | Pusateri | H04L 41/085 |
| | | | 709/222 |
| 2010/0115073 A1* | 5/2010 | Odenwald, Jr. | G06F 3/0622 |
| | | | 709/223 |
| 2014/0006347 A1* | 1/2014 | Qureshi | H04L 9/0822 |
| | | | 707/621 |
| 2014/0007183 A1* | 1/2014 | Qureshi | H04W 4/029 |
| | | | 726/1 |
| 2014/0157361 A1* | 6/2014 | Agarwal | H04L 63/166 |
| | | | 726/1 |
| 2016/0182296 A1* | 6/2016 | Sharp-Paul | H04L 41/0813 |
| | | | 709/224 |
| 2017/0149792 A1* | 5/2017 | Smith | H04L 63/126 |
| 2017/0214717 A1* | 7/2017 | Bush | G05B 19/0426 |
| 2018/0115550 A1* | 4/2018 | Sapir | H04L 67/1097 |
| 2018/0255092 A1* | 9/2018 | Thubert | H04L 63/102 |
| 2019/0327271 A1* | 10/2019 | Saxena | G06N 3/0454 |
| 2021/0099490 A1* | 4/2021 | Crabtree | G06F 16/2477 |

OTHER PUBLICATIONS

Converged Campus Network, (Research Paper), Feb. 2015, 20 Pgs.
Meru Connect, (Research Paper), Retrieved Mar. 5, 2019, 7 Pgs.
Rule Your Network H3C intelligent Management Center, (Research Paper), Retrieved Mar. 5, 2019, 8 Pgs.
Sood, A., Network Access Control, (Research Paper), Rivier Academic Journal, 2007, vol. 3, No. 2, 12 Pgs.

* cited by examiner

MULTI-VENDOR SUPPORT FOR NETWORK ACCESS CONTROL POLICIES

BACKGROUND

The term "network policy" refers to a set of criteria used to define a formal set of technical rules to be complied with before a particular device or system is allowed to access a network. Some examples of a network policy include a specification as to what Virtual Local Area Network ("VLAN") a particular user is allowed to access, data specifying what anti-virus update level a system must be using, rules about programs that may or may not be executed on a network (e.g., streaming media programs), and any firewall-like rules defining what network traffic is allowed on a network. By way of more specific examples, a network policy may include that a bank teller can only connect to a central bank network during business hours, that an end user can only connect to a network if the end-user is running a corporate-specified anti-virus product, and that a specific class of employees of a company can only perform certain functions on a network, such as access email.

BRIEF DESCRIPTION OF THE DRAWINGS

Various examples of this disclosure that are proposed as examples will be described in detail with reference to the following figures, wherein like numerals reference like elements, and wherein.

DETAILED DESCRIPTION

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

For the purposes of this disclosure, a "network protocol" is a set of rules and conventions for communication between network devices. Support for network protocols can be built into software, hardware, or both. To successfully send and receive information within a network, various devices in a communication exchange must accept and follow protocol conventions. Network protocols can provide authentication (verifying user credentials before granting access to networks) and authorization (verifying one or more user access policies on how much and what kinds of resources are allowed for an authenticated user) for users that connect and use a network service.

Also for the purposes of this disclosure, the term "attribute" refers to some feature or capability of a particular protocol that can be used to provide some form of function for a particular device and/or for a network that employs the particular device. For example, a particular authentication process may be considered an attribute of a network protocol or of a network switch.

The term "Network Access Control" ("NAC") refers to some form of computer-based system, such as a server, that enforces network protocols according to one of more network policy considerations. It is to be appreciated, however, that a network access control system does not need to be a single dedicated device, and in a variety of examples a network access control system can be incorporated into one or more devices that perform other services or functions.

The term "Network Access Device" ("NAD") is any electronic circuit/device capable of communicatively coupling a user terminal to a particular network. More specifically, a network access device is any device that, when incorporated into a particular network of some sort, provides communication access between the particular network and one or more user terminals. Examples of network access devices include network switches, Virtual Private Network ("VPN") concentrators, network bridges, and wireless access points.

The term "user terminal" refers to any communication device that enables an end-user to communicate with a network or otherwise access at least one service provided by a network. Non-limiting examples of user terminals include any number of computers (e.g., laptop computers), smart phones, tablet computers, and Personal Digital Assistants (PDAs).

As mentioned above the term "network policy" refers to a set of system criteria used to define the rules to be complied with before a particular device or system is allowed to access a network.

A "network enforcement profile" (or "enforcement profile") is some form of collection of information entered onto a computer-based system that is used to implement the rules of a particular network policy in such a way that the computer-based system can manage the particular network policy. For example, an enforcement profile might include a list of specific employees that can access a particular function of a network or a range of hours that the particular function can be accessed.

A "set" and a "group" as used herein each refer to a collection of one or more items. By way of example, one or more network enforcement profiles may form a network enforcement profile set, and one or more network access devices may form a network access device group.

The standardizing of protocols in modern networks is a significant goal for the vendors of network hardware and software. Network standardization is generally accomplished through a series of individual standards created via a "Request For Comments" ("RFCs") process with the resultant standards also referred to as "RFCs." Such RFCs establish an agreed upon set of basic protocols and protocol attributes than can be used by a network access control system to, for example, enforce a variety of network access control profiles and/or manage a variety of network access devices.

However, despite a desire to standardize network protocols across industry, various vendors often provide many additional control features beyond the scope of RFCs by establishing attributes and data formatting that are specific and exclusive to a particular vendor. Because of these additional vendor-specific features, it is difficult to design a network having components from different vendors that take advantage of custom enforcement capabilities the additional vendor-specific features provide while at the same time allowing a network administrator to manage network enforcement policies from a conceptually high level.

In addition to the issues raised by using equipment made by different vendors, even same vendor network access devices deployed in different geographic locations might call for location specific attributes to achieve a desired enforcement profile. For example, it may be useful to use a first group of specially-configured network access devices to address network access from the main office of a large corporation while using a second group of specially-configured network access devices to address network access from branch offices of the same corporation.

Given the desirability to manage network policies at a high level while not being entangled in the minutiae of individual network access devices, the presently-disclosed methods and systems propose a hierarchal approach to network management. The proposed methods and systems address the above-discussed network policy standardization issues while still enabling networks to take advantage of vendor-specific equipment in a multi-vendor heterogeneous deployment of network access devices. The proposed methods and systems accomplish this by creating a multi-layer hierarchy whereby: (1) network policies are handled at a high conceptual layer; (2) enforcement profiles containing information usable to manage individual network policies are handled at a lower layer; and (3) specific organizations and protocols of network access devices usable to manage enforcement policies are addressed at even lower layers.

Figure 1:
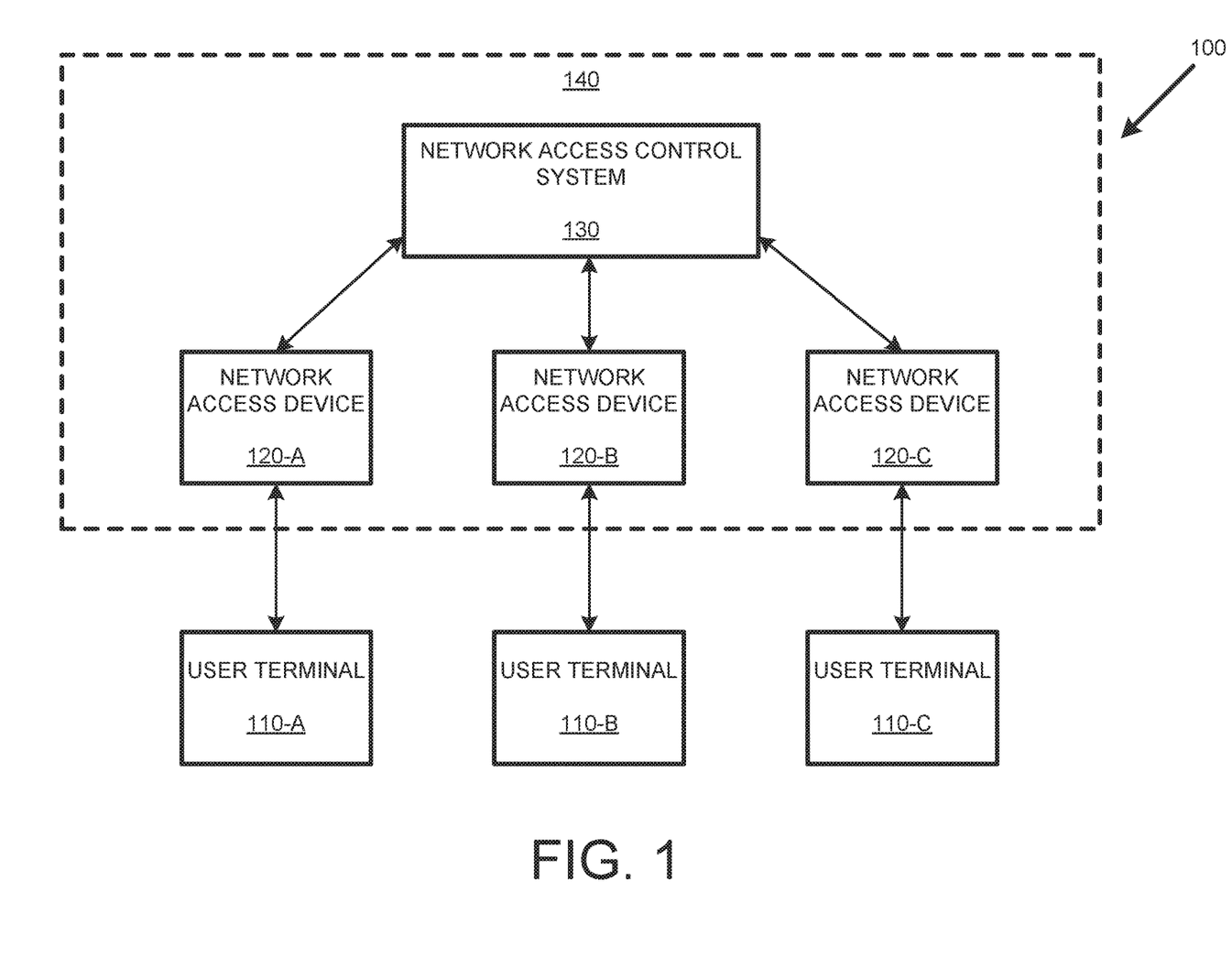
FIG. 1 depicts a communication network that that includes a network access control system that employs top-down network policy implementation, according to one or more examples of the disclosure.

Turning to FIG. 1, a communication system 100 is depicted that includes a number of user terminals {110-A . . . 110-C} communicatively coupled to a network 140. As can be seen in FIG. 1, the network 140 includes a number of network access devices {120-A . . . 120-C} communicatively coupled to the user terminals {110-A . . . 110-C} and communicatively coupled to a network access control system 130.

Figure 2:
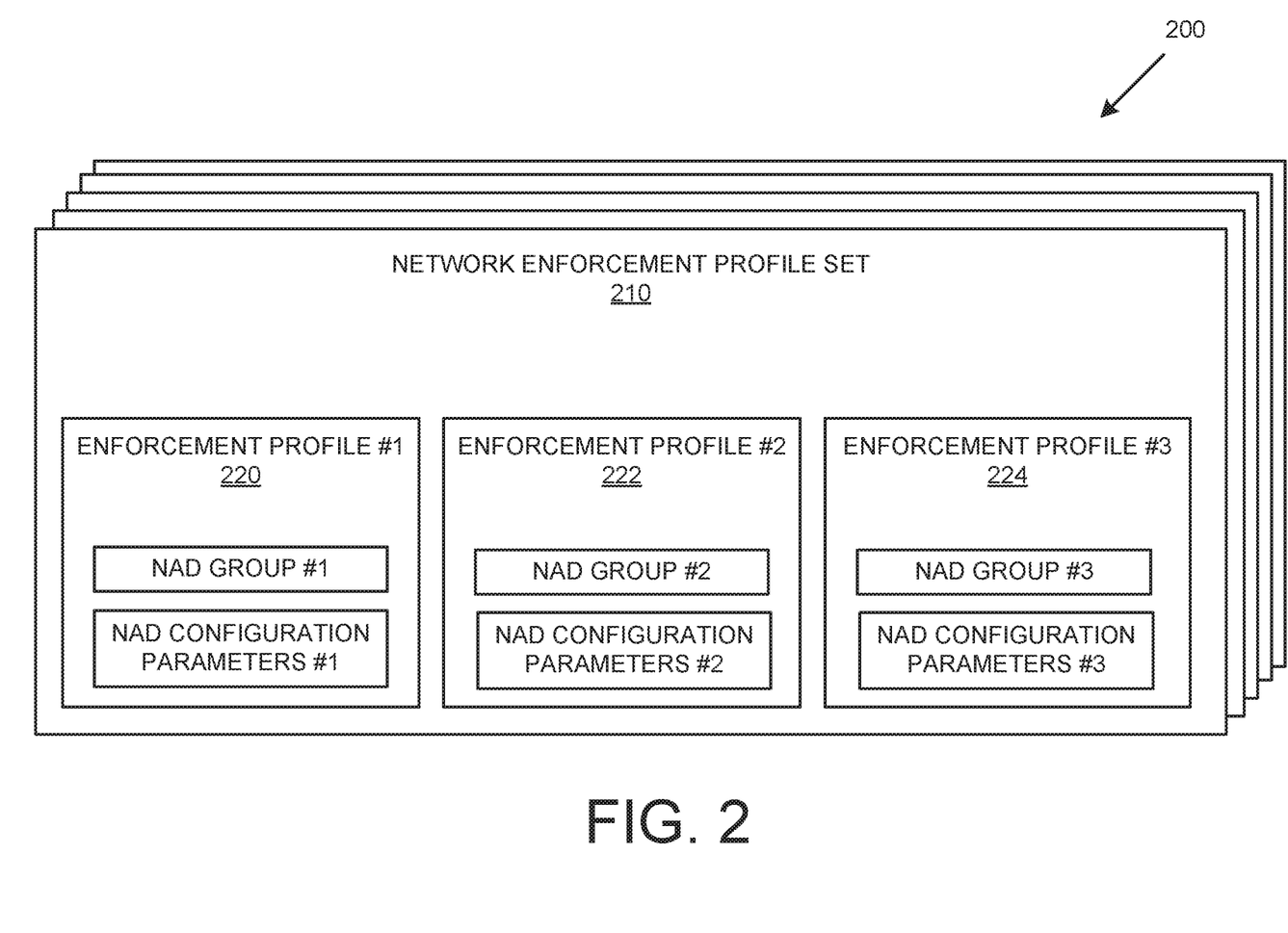
FIG. 2 is a block diagram of a network control system that enables a network administrator to implement network policies using a top-down approach, according to one or more examples of the disclosure.

In operation, a network administrator using the network access control system 130 can perform a number of operations at the various above-discussed network information layers, which are described with respect to FIG. 2. As shown in FIG. 2, a set of network services 200 includes a collection of network enforcement profile sets with an example network enforcement profile set 210 provided in front. A particular class of network policies may be thought of as a "network service." For example, one network service may be directed to policies for maintaining network security, a second network service may be directed to policies for limiting available network services, and a third network service may be directed to policies for limiting access to a network to particular users. Generally, a network administrator may select any number of network enforcement profile sets from any particular network service.

As is further shown in FIG. 2, the example enforcement profile set 210 includes three separate enforcement profiles {220, 222, 224}. However, in various examples, the number of enforcement profiles for a given enforcement profile set can vary from one enforcement profile to an unlimited maximum.

As is discussed above individual network enforcement profiles contain the formal, technical information used in order to manage a particular network enforcement policy. In the present example of FIG. 2, each enforcement profile {220, 222, 224} includes two types of information including a Network Access Device ("NAD") group and a set of NAD configuration parameters usable to appropriately configure the respective NAD group.

The NAD group information allows a network administrator to define each NAD group to include heterogeneous network access devices (i.e., devices from more than one vendor) in order to mix and match vendor-specific capabilities that together may address a particular network enforcement issue. By way of example, assume that the example network enforcement profile set 210 is directed to managing a variety of Bring-Your-Own-Device ("BYOD") scenarios. The first enforcement profile 220 may address BYOD user-roles using a NAD group consisting of first vendor devices; the second enforcement profile 222 may address a BYOD Access Control List ("ACL") using a second NAD group consisting of different first vendor devices; and the third enforcement profile 224 may address the use of a vendor-specific Virtual Local Area Networks ("VLANs") for BYODs located in different geographic locations. All such different enforcement profiles can be grouped together and labeled as a "BYOD enforcement" profile set" to make it intuitive for a network administrator to manipulate at a high level.

In order to perform any customization of a network policy, a network administrator can modify a portion of the example network policy enforcement profile set 210. For example, it may be useful for a network administrator to include a larger number of network access devices in a particular NAD group to handle a greater amount of traffic.

According to various examples, the individual enforcement profiles {220, 222, 224} may work independently of one another. For instance, enforcement profile 220 may enforce network access for a first class of employees using a wireless interface, enforcement profile 222 may enforce network access for a second class of employees using the same type of wireless interface, and enforcement profile 224 may enforce network access for all Virtual Private Network ("VPN") users.

According to various other examples, the individual enforcement profiles {220, 222, 224} may work in a coordinated fashion. For instance, enforcement profile 220 may enforce a network policy by limiting access hours for a particular service, enforcement profile 222 may enforce network policy by limiting access of the same service to employees found in an Access Control List ("ACL"), and enforcement profile 224 may enforce network access by restricting a type of data that may be used by the service.

Figure 3:
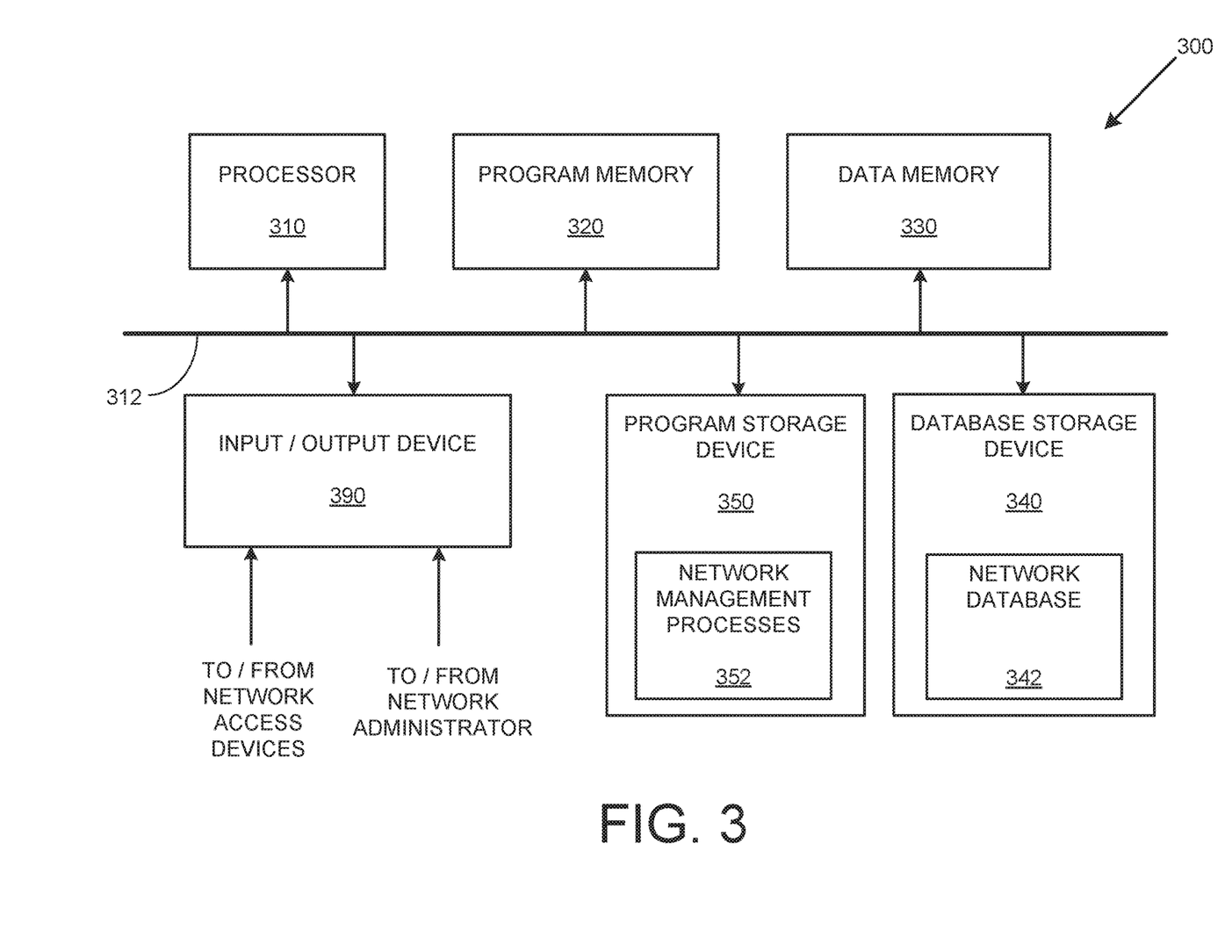
FIG. 3 is a flowchart of a method for enabling a network administrator to implement network enforcement policies using a top-down approach, according to one or more examples of the disclosure.

FIG. 3 is a block diagram of a processing system 300 that enables a network administrator to implement network policies using a top-down implementation. As shown in FIG. 3, the example processing system 300 includes a processor 310 (e.g., a CPU), a program memory 320, a data memory 330, a database storage device 340, a program storage device 350, and an input/output device 390. The above components 310-390 are communicatively coupled together by a control/data bus 312.

Although the example processing system 300 of FIG. 3 uses a control/data bussed architecture, it should be appreciated that any other architecture may be used as is well. For instance, in various examples, the various components 310-390 can take the form of separate electronic components coupled together via a series of separate busses.

Still further, in other examples, one or more of the various components 310-390 can take form of separate servers coupled together via one or more networks. Additionally, it should be appreciated that each of components 310-390 advantageously can be managed using multiple computing devices employed in a cooperative fashion. For example, by employing two or more separate computing devices, e.g., servers, to provide separate processing and data-handling needs, processing bottlenecks can be reduced/eliminated, and the overall computing time may be significantly reduced.

It also should be appreciated that some processing, typically implemented in software/firmware routines residing in program memory 320, alternatively may be implemented using dedicated processing logic. Still further, some processing may be performed by software/firmware processes residing in separate memories in separate servers/computers being executed by different controllers.

In operation, the example processing system 300 can first perform a number of setup operations including transferring an operating system and a number of appropriate program(s)/process(es) from the program storage device 350 to the program memory 320. In the present example of FIG. 3, a number of network management processes 352 are used to, for example, configure individual network access devices and implement/manage network policies using the network access devices.

In addition, setup operations may include transferring an existing network database 342 from the database storage device 340 to the data memory 330. As is discussed herein, with reference to FIG. 2, the example network database 342 may contain a variety of information including network policies, information relating to individual network enforcement profiles and profile sets, information describing groups of network access devices, and network access device configuration parameters.

Subsequent operations of the example processing device 300 are discussed below with respect to FIGS. 4-7.

Figure 4:
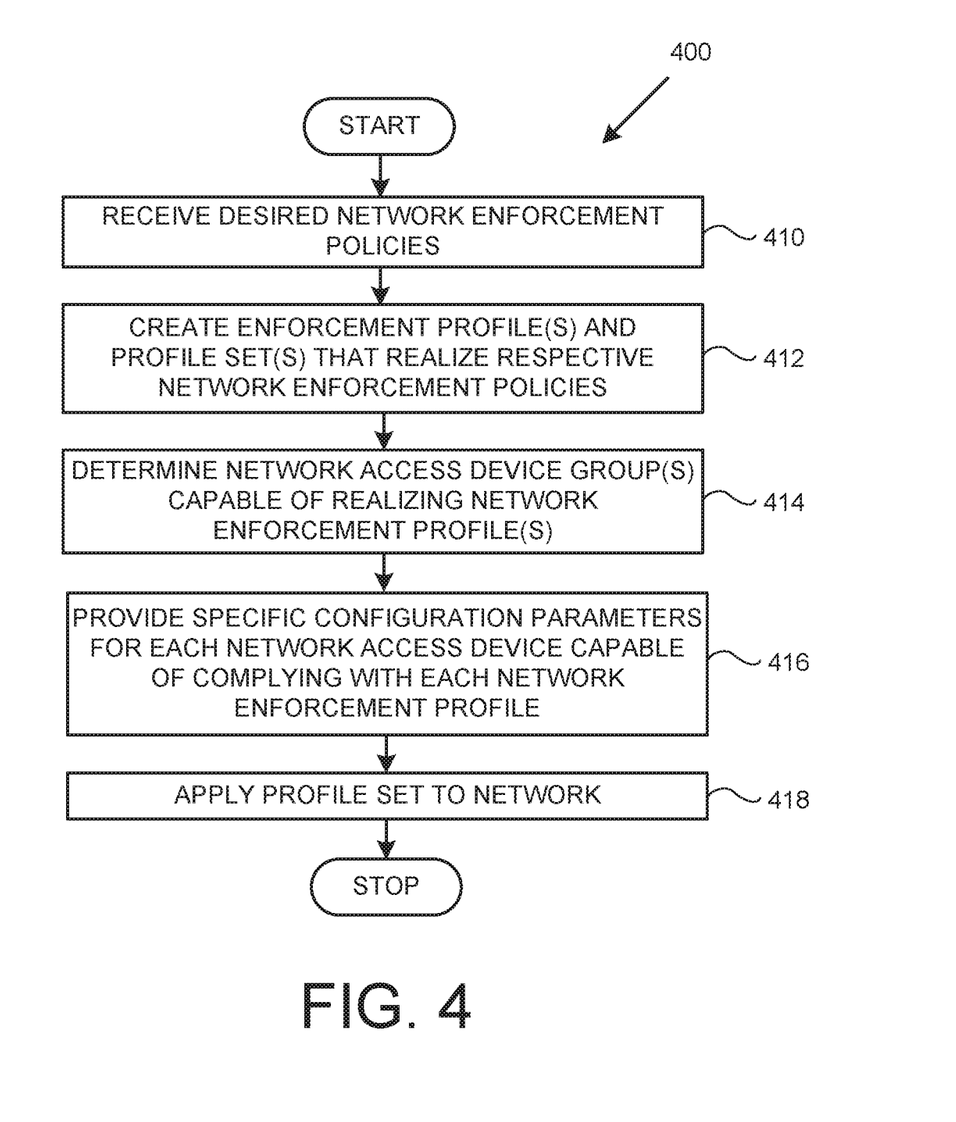
FIG. 4 is a flowchart of a method for selecting and implementing network enforcement policies, according to one or more examples of the disclosure.

FIG. 4 is a flowchart of a method 400 for enabling a network administrator to implement network enforcement policies using a top-down approach. It is to be appreciated to those skilled in the art in light of this disclosure that, while the various operations of FIG. 4 are shown according to a particular order for ease of explanation, that certain operations may be performed in different orders or performed in a parallel fashion. It is to be further appreciated that certain operations may be omitted in some examples.

The method 400 starts in operation 410 where a network access control system, such as the network access control system 400 of FIG. 4, receives a number of desired network enforcement policies. As discussed above such network enforcement policies may be provided as a "service" of related network policies. However, it is envisioned that network enforcement policies do not need to be related, and that the breadth of network enforcement policy types that may be considered in the present method 400 can vary to any known or otherwise usable range of concerns. For example, as discussed above, a network enforcement policy may be a network access control policy that includes at least one restriction on network access relating to what services may be accessed, who may access a network, when the network may be accessed, and so on.

In operation 412, one or more network enforcement profiles are created based on at least one network enforcement policy, and optionally one or more network enforcement policy sets may be created using a combination of one or more network enforcement profiles.

In operation 414, for each network enforcement profile a network access device group capable of managing a network enforcement profile may be determined. In principle, each network access device group can be derived from those network access devices that constitute heterogeneous network having network access devices from different vendors so long as the network access devices are collectively capable of managing the network enforcement profile. As mentioned above, such network access devices may include, for example, a network switch, a Virtual Private Network ("VPN") concentrator, a network bridge, and a wireless access point as non-limiting examples.

It is to be appreciated that, in some examples, different network access device groups can employ the same network access devices. In other examples different network access device groups can include a partial overlap of different network access devices, and in still other examples each network access device group can include devices not found in any other network access device group.

Still further, in heterogeneous deployments of network access devices, different network access device groups may include devices from different vendors. For example, a first network access device group may include a network access device from a first vendor, a second network access device group may include a network access device from a second vendor, and so on.

In operation 416, for each network access device used in a given network enforcement profile, the specific configuration parameters (both standard and vendor-specific) used to appropriately configure each applicable network access devices is provided. Such configuration parameters allow the network access devices to manage the respective network enforcement profile and the respective network enforcement policy.

Operations 410-416 amount to creating a data structure that includes one or more network enforcement policies, and one or more respective network enforcement profile sets with respective network access device groups and configuration parameters, which may be added to a service list accessible to a network administrator.

In operation 418, a network enforcement profile set for each network enforcement policy is applied to a network. Such an application includes applying both standard and vendor-specific configuration parameters each network access device included in a respective network access device group.

Figure 5:
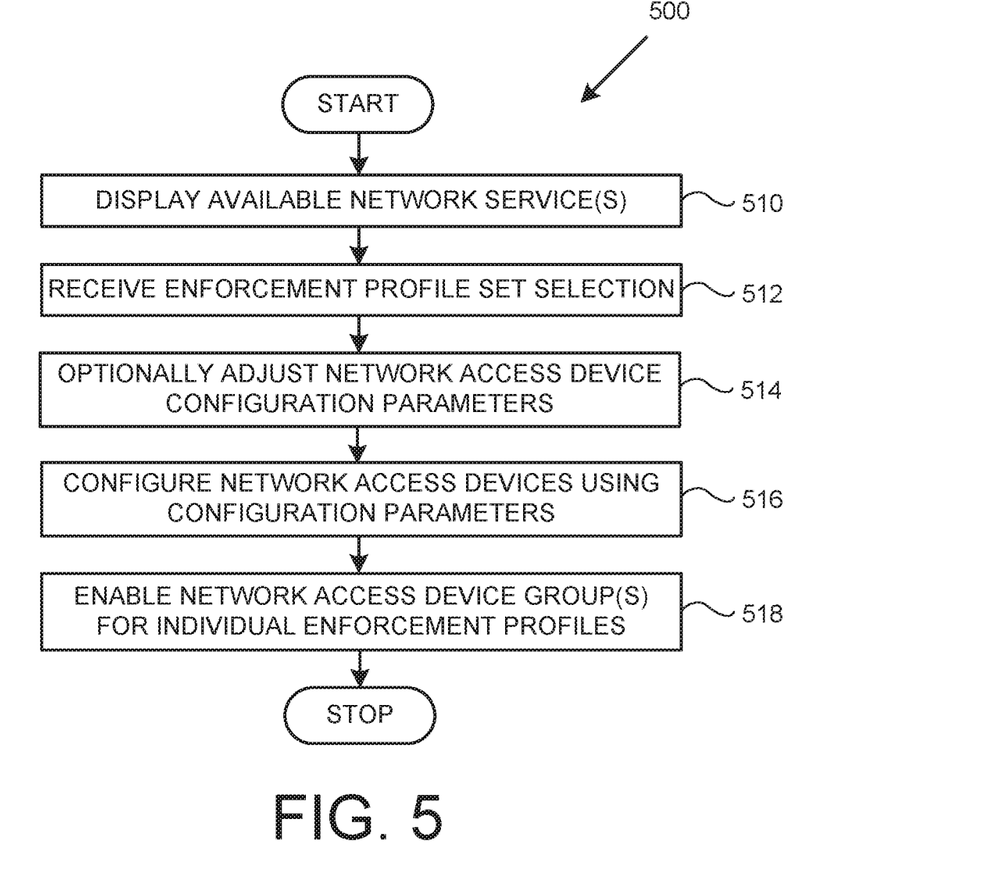
FIG. 5 depicts a computing device including a processor communicatively connected to a storage device containing instructions for enabling a network administrator to implement network enforcement policies using a top-down approach, according to one or more examples of the disclosure.

FIG. 5 depicts a flowchart of a method 500 usable for operating for selecting and implementing network enforcement policies. It is to be appreciated to those skilled in the art in light of this disclosure that, while the various operations of FIG. 5 are shown according to a particular order for ease of explanation, that certain operations may be performed in different orders or performed in a parallel fashion. It is to be further appreciated that certain operations may be omitted in some examples.

The method 500 starts in operation 510 where one or more network services are displayed to a network administrator using a device/system, such as the network access control system 300 of FIG. 3. As discussed above a network service includes a collection of network enforcement profile sets that may or may not be related.

In operation 512, a network enforcement profile set selection is received from the network administrator, and in operation 514 the configuration parameters for each applicable network access device may be adjusted in order to allow a network administrator to better customize a network enforcement profile to a desired policy.

In operation 516, the applicable network access devices are configured using the configuration parameters, and in operation 518, the applicable network access devices for each network access device group are appropriately enabled.

Figure 6:
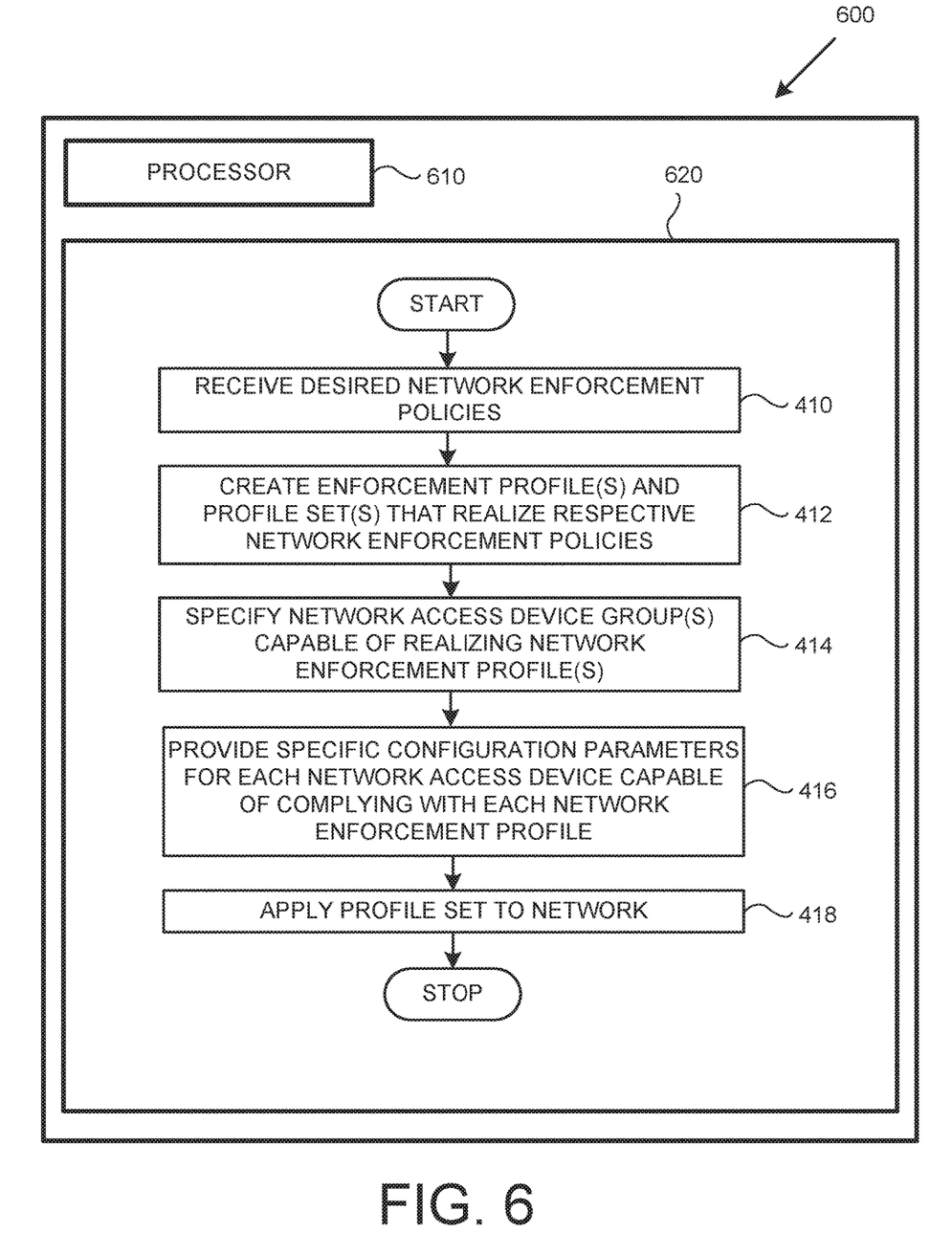
FIG. 6 depicts a computing device including a processor communicatively connected to a storage device containing instructions for selecting and implementing network enforcement policies, according to one or more examples of the disclosure.

FIG. 6 depicts a processing system 600 that includes a processor 610 communicatively connected to a computer program product/storage device 620 containing instructions {410-418} for enabling a network administrator to implement network enforcement policies using a top-down approach. The computer program product/storage device 620 is a non-transient computer-readable storage memory containing a plurality of instructions {410-418} such that, when operated upon by a processing system 600 that includes the processor 610 and a memory communicatively coupled to the processor 610 (e.g., one or both of the memories 320-330 of FIG. 3), causes the processor 610 to perform a number of operations consistent with the flowchart of FIG. 4. Because the operations of FIG. 4 have already been described in detail, such operations need not be repeated as an issue of brevity.

Figure 7:
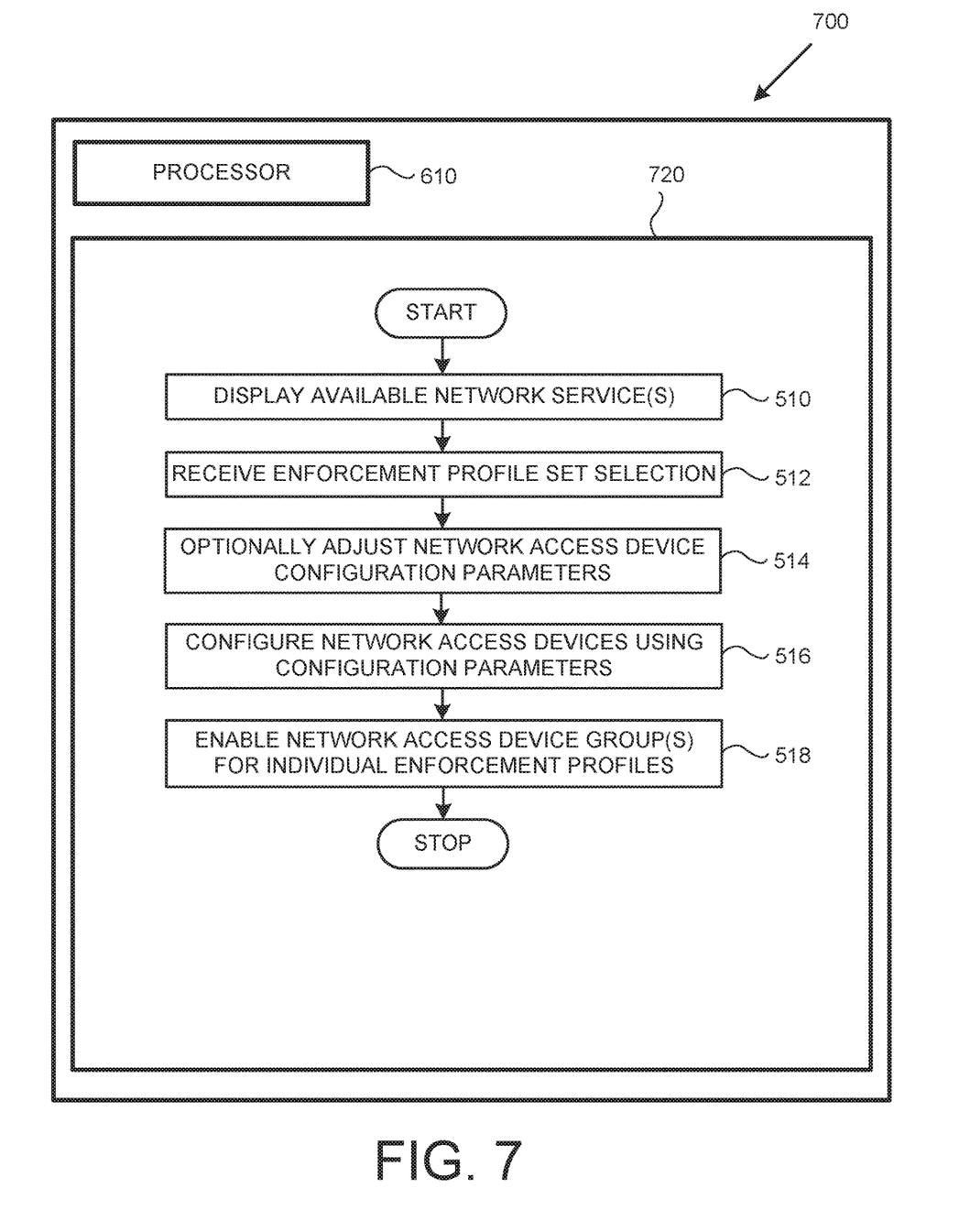
FIG. 7 depicts a set of network services with an example network enforcement profile set based upon a network policy, according to one or more examples of the disclosure.

FIG. 7 depicts a processing system 700 that includes a processor 710 communicatively connected to a computer program product/storage device 720 containing instructions {510-518} for selecting and implementing network enforcement policies. As with FIG. 6, the computer program product/storage device 720 of FIG. 7 is a non-transient computer-readable storage memory containing a plurality of instructions {510-518} such that, when operated upon by a processing system that includes the processor 710 and a memory communicatively coupled to the processor 710 (e.g., one or both of the memories 320-330 of FIG. 3), causes the processor 710 to perform a number of operations consistent with the flowchart of FIG. 5. Because the operations of FIG. 5 have already been described in detail, such operations need not be repeated as an issue of brevity.

In various examples the above-described systems and/or methods may be implemented using any form of known or later-developed circuitry (e.g., electronic, optical) or programmable device, such as a computer-based system or programmable logic. It should be appreciated that the above-described systems and methods can be implemented using any of various known or later developed programming/scripting languages, such as "Perl," "Object Pascal," "Pascal" "SQL," "C," "C++," "FORTRAN," "Python," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes. Once an appropriate device has access to the information and programs contained on the storage media/computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A method comprising:
creating a first network enforcement profile associated with at least one network enforcement policy, wherein the first network enforcement profile is a collection of information used to implement the rules of the one or more network enforcement policies;
determining a network access device group of network access devices of a plurality of heterogeneous network access devices, wherein the network access devices of the network access device group are capable of managing the one or more network enforcement policies, and the network access devices of the network access device group are associated with a plurality of vendors;
associating identities of the network access devices of the network access device group with the first network enforcement profile;
providing vendor-specific configuration parameters associated with the plurality of vendors to configure the network access devices of the network access device group to manage the one or more network enforcement policies;
associating the vendor-specific configuration parameters with the first network enforcement profile;
storing a data structure representing the first network enforcement profile; and
configuring a network to implement the one or more network enforcement policies, wherein the configuring comprises accessing the data structure, and responsive to the accessing of the data structure, applying the vendor-specific configuration parameters to the network access devices of the network access device group.

2. The method of claim 1, further comprising:
creating a plurality of network enforcement profiles including the first network enforcement profile, wherein the plurality of network enforcement profiles together form a network enforcement profile set, and the plurality of network enforcement profiles together manage the at least one network enforcement policy.

3. The method of claim 2, further comprising:
for each network enforcement profile of the plurality of network enforcement profiles, determining a respective network access device group of the plurality of heterogeneous network access devices that is capable of managing the network enforcement profile.

4. The method of claim 3, further comprising:
providing vendor-specific configuration parameters for at least one network access device of each respective network access device group so as to cause the network to manage the network enforcement profile set.

5. The method of claim 4, further comprising:
providing vendor-specific configuration parameters for all network access devices of each respective network access device group so as to cause the network to manage the network enforcement profile set.

6. The method of claim 5, wherein at least a first network access device group is different from a second network access device group.

7. The method of claim 6, wherein each network access device group is different from any other network access device group.

8. The method of claim 7, wherein a first network access device group includes a network access device from a first vendor of the plurality of vendors, and a second network access device group includes a network access device from a second vendor of the plurality of vendors.

9. The method of claim 4, further comprising placing the data structure into a service list accessible to a network administrator.

10. The method of claim 1, further comprising placing the at least one network enforcement policy into a service list of network enforcement policies.

11. The method of claim 1, wherein the network enforcement policy is a network access control policy that includes at least one restriction on network access.

12. A system for configuring a network that includes a plurality of heterogeneous network access devices, the system comprising a processor and a memory communicatively coupled to the processor, the memory containing instructions that cause the processor to:
create a first network enforcement profile associated with at least one network enforcement policy, wherein the first network enforcement profile is a collection of information used to implement the rules of the one or more network enforcement policies;
determine a network access device group of the plurality of heterogeneous network access devices, wherein the network access devices of the network access device group are capable of managing the one or more network enforcement policies, and the network access devices of the network access device group are associated with a plurality of vendors;
associate identities of the network access devices of the network access device group with the first network enforcement profile;
provide vendor-specific configuration parameters associated with the plurality of vendors to configure the network access devices of the network access device group to manage the one or more network enforcement policies;
associate the vendor-specific configuration parameters with the first network enforcement profile;
store a data structure representing the first network enforcement profile; and
configure the network to implement the one or more network enforcement policies, wherein the configuring comprises accessing the data structure, and responsive to the accessing of the data structure, apply the vendor-specific configuration parameters to the network access devices of the network access device group.

13. The system of claim 12, wherein the instructions further cause the processor to:
create a plurality of network enforcement profiles including the first network enforcement profile, wherein the plurality of network enforcement profiles together form a network enforcement profile set, and the plurality of network enforcement profiles together manage the at least one network enforcement policy.

14. The system of claim 13, wherein the instructions further cause the processor to:
for each network enforcement profile of the plurality of network enforcement profiles, determine a respective network access device group of the plurality of heterogeneous network access devices that is capable of managing the network enforcement profile.

15. The system of claim 14, wherein the instructions further cause the processor to:
provide vendor-specific configuration parameters for at least one network access device of each respective network access device group so as to cause the network to manage the network enforcement profile set.

16. The system of claim 15, wherein the instructions further cause the processor to:
provide vendor-specific configuration parameters for all network access devices of each respective network access device group so as to cause the network to manage the network enforcement profile set.

17. The system of claim 15, wherein the instructions further cause the processor to:
place a data structure that includes the at least one network enforcement policy, the respective network enforcement profile set, and each respective network access device group into a service list accessible to a network administrator.

18. The system of claim 15, wherein the network enforcement policy is a network access control policy that includes at least one restriction on network access.

19. A computer program product, comprising:
a non-transitory computer-readable storage memory containing a plurality of instructions such that, when operated upon by a processing system that includes a processor and a memory communicatively coupled to the processor, causes the processor to:
create a first network enforcement profile associated with at least one network enforcement policy, wherein the first network enforcement profile is a collection of information used to implement the rules of the one or more network enforcement policies;
determine a network access device group of a plurality of heterogeneous network access devices, wherein the network access devices of the network access device group are capable of managing the one or more network enforcement policies, and the network access devices of the network access device group are associated with a plurality of vendors;
provide vendor-specific configuration parameters associated with the plurality of vendors to configure the network access devices of the network access device group to manage the one or more network enforcement policies;
associate the vendor-specific configuration parameters with the first network enforcement profile;
store a data structure representing the first network enforcement profile; and
configure a network to implement the one or more network enforcement policies, wherein the configuring comprises accessing the data structure, and responsive to the accessing of the data structure, apply the vendor specific configuration parameters to the network access devices of the network access device group.

20. The computer program product of claim 19, wherein the plurality of instructions further cause the processor to:
- create a plurality of network enforcement profiles including the first network enforcement profile, wherein the plurality of network enforcement profiles together form a network enforcement profile set, and the plurality of network enforcement profiles together manage the at least one network enforcement policy;
- for each network enforcement profile of the plurality of network enforcement profiles, determine a respective network access device group of the plurality of heterogeneous network access devices that is capable of managing the network enforcement profile; and
- provide vendor-specific configuration parameters for all network access devices of each respective network access device group so as to cause the network to manage the network enforcement profile set.

\* \* \* \* \*